United States Patent [19]

Breeden

[11] Patent Number: 4,544,103
[45] Date of Patent: Oct. 1, 1985

[54] ENLARGED FOOD PUSHER WITH CLEAN-OUT WINDOWS IN A FEEDTUBE PROTECTOR

[75] Inventor: John W. Breeden, Westport, Conn.
[73] Assignee: Cuisinarts, Inc., Greenwich, Conn.
[21] Appl. No.: 586,237
[22] Filed: Mar. 5, 1984
[51] Int. Cl.$^4$ .............................................. B02C 25/00
[52] U.S. Cl. .................................. 241/37.5; 241/166; 241/282.1
[58] Field of Search ............. 241/37.5, 166, 92, 282.1, 241/282.2

[56] References Cited

U.S. PATENT DOCUMENTS 4,226,373 10/1980 Williams ............................. 241/37.5
4,226,374 10/1980 Kapka ................................ 241/37.5

Primary Examiner—Mark Rosenbaum
Attorney, Agent, or Firm—Parmelee, Bollinger & Bramblett

[57] ABSTRACT

An enlarged food pusher with clean-out windows is provided in a feedtube protector assembly utilized with a food processor. The feedtube protector includes an outer sleeve nestable around the exterior of an expanded feedtube which forms a first passageway for feeding food items through the cover into the bowl. A telescoping oval-shaped food pusher on the outer sleeve moves longitudinally in the expanded feedtube for pushing food items onto the rotary tool. A second passageway is provided by a tubular member extending through the food pusher which is adapted to receive a removable food pusher normally retained within the second passageway when the larger food pusher is being used. The oval-shaped food pusher has an enclosed bottom end extending from its periphery inwardly to the second food passageway. A pair of crescent-shaped cavities having four cusp regions defined between the oval-shaped pusher and the tubular member are open and may accumulate food which may be difficult to remove. To alleviate this problem L-shaped clean-out and drain ports are provided in the side wall of the captured food pusher adjacent the bottom thereof. One leg of each of these L-shaped ports communicate with a respective cusp region and the other leg is wider and extends vertically above the first leg thereby providing a means for cleaning the cavities within the interior of the oval-shaped food pusher.

4 Claims, 5 Drawing Figures

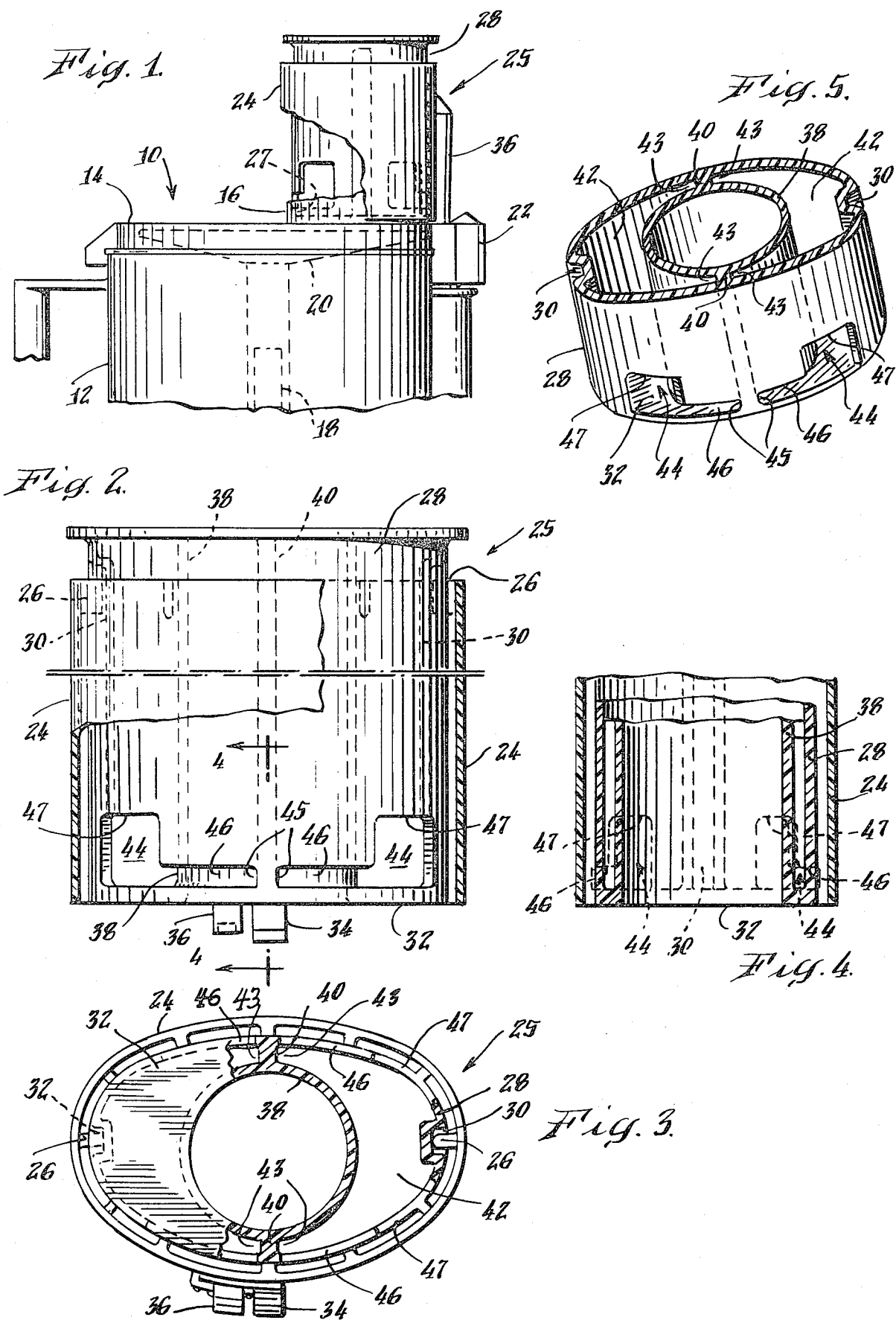

ENLARGED FOOD PUSHER WITH CLEAN-OUT WINDOWS IN A FEEDTUBE PROTECTOR

BACKGROUND OF THE INVENTION

This invention relates to feedtube protectors for the expanded feedtubes of food processors, and more particularly to such feedtube protectors which employ a captivated food pusher with a bottom surface enclosing one end of the food pusher. Such feedtube protectors are improved in accordance with the present invention by providing L-shaped clean-out and drain ports adjacent the cusp regions of the pair of crescent-shaped spaces between the inner circular tubular member and the oval-shaped food pusher thereby facilitating cleaning.

Food processors of the type to which the present invention is applicable have a working bowl with tool engaging drive means within the bowl on which various selected rotary food processing tools can be engaged to be driven by an electric drive for performing various food processing operations in accordance with the desires of the user. A detatchable cover is secured on top of the bowl during use which cover includes an expanded feedtube having a passage that opens downwardly through the cover into the top of the bowl. The food items to be processed are placed in this feedtube passage and then manually pushed down through the feedtube into the bowl by means of a removable food pusher which is slidable down through the feedtube in the manner of a plunger. For background information with respect to expanded feedtubes and protector assemblies for them, the reader is referred to the Williams U.S. Pat. No. 4,226,373.

The size and shape limitations previously placed on the feedtube were alleviated by utilizing an expanded feedtube as shown and described in Williams U.S. Pat. No. 4,226,373 which maintains safety by providing a feedtube protector in the form of an outer sleeve which carries an actuator cooperating with control means for enabling the machine operation only when the sleeve is properly positioned over the expanded feedtube. This sleeve has associated therewith a movable food pusher captivated in the sleeve and mounted for telescoping movement within the sleeve. When the cover is properly positioned on the bowl and this sleeve is mounted over the expanded feedtube, the food pusher is manually movable within the passageway in the expanded feedtube and the actuator on the sleeve is operatively associated with the control means of the food processor to permit operation of the motor drive. Accordingly, inadvertent insertion of the hand or foreign object into the feedtube is prevented when the rotary tool is being driven. By virtue of this arrangement the feedtube can have a large ("expanded") cross-sectional area so that large food items can be inserted whole into the expanded feedtube, and such expanded cross-sectional shape is usually oval as seen looking at the feedtube in the axial direction. For convenience in processing relatively narrow elongated food items, for example, food items such as carrots, cucumbers, pepperoni, celery etc., a smaller feedtube is formed by a tubular member of circular cross section extending down axially through the inside of the larger captivated oval-shaped food pusher. This smaller circular feedtube has dimensions and proportions fitting snuggly within the oval-shaped pusher. The second smaller passageway requires a separate food pusher which can be operated without removing the outer sleeve from operative engagement with the control means of the food processor. The small food pusher also includes a retainer for holding it locked within the captured larger food pusher so that a complete bottom surface is provided for contacting food which is to be plunged onto the rotary blade when inserted into the larger feedtube. With the circular tubular member running internally through the oval-shaped food pusher a pair of crescent-shaped cavities are defined between them. Each crescent-shaped cavity has a pair of narrow converging cusp regions which are relatively inaccessible near the bottom of the oval-shaped food pusher. In other words, there are four of these inaccessible cusp-regions at the bottom of the oval-shaped food pusher, which are difficult to wash clean either manually or in a dishwasher.

SUMMARY

Accordingly, it is an object of this invention to provide a new and improved feedtube protector for use on a food processor which may be more easily cleaned.

In carrying out this invention in one illustrative embodiment thereof, a feedtube protector is provided for use in a food processor of the type including a housing containing an electric motor drive and control means for rendering the motor drive inoperative unless the control means is activated. A bowl is mounted on the housing for enclosing a rotatable tool within the bowl drivable by tool drive means when the motor drive is rendered operative by actuation of said control means. A removable cover adapted to be positioned on the bowl has an expanded feedtube mounted on the cover forming a first food passageway for feeding food items through the cover into the bowl towards the rotating tool. The feedtube protector has an outer sleeve nestable in a predetermined position around the exterior of the feedtube and a captured food pusher of oblong cross-sectional configuration is captured in telescoping relationship with respect to the outer sleeve for enabling the captured food pusher to move longitudinally within the outer sleeve. The captured food pusher is in alignment with the interior of the outer sleeve for causing the pusher to become aligned with the first food passageway and plungable therein only when the outer sleeve is nested around the feedtube. The captured food pusher has a bottom surface enclosing one end of the captured food pusher which is being utilized for plunging food items into the bowl. A second food passageway is formed by a circular-shaped, tubular member extending through said captured food pusher defining crescent-shaped cavities having cusp regions in said captured food pusher. An improved feedtube protector structure is provided with at least one clean-out port in a side wall of the captured food pusher adjacent the bottom thereof and at least one drain port extending horizontally around the periphery of the bottom of the captured food pusher with the clean-out port and the drain port being joined and communicating with the cusp regions of each of said crescent-shaped cavities in said captured food pusher. The clean-out port extends vertically above the drain port thereby providing a convenient means for cleaning the interior of the captured food pusher. The improved cleaning structure preferably includes a plurality of clean-out and drain ports which are preferably symmetrically spaced in the side wall about the bottom of the captured food pusher in communication with the cusp regions of said crescent-shaped cavities.

It is among the many advantages of the improved feedtube protector that the larger clean-out port may be utilized for the insertion of a tool manually therein or the receipt of a larger volume of cleaning water and/or detergent while the drain ports permit the flushing of the interior of the feedtube pusher allowing either manual and/or dishwasher cleaning of the entire feedtube protector.

BRIEF DESCRIPTION OF THE DRAWINGS

The invention, together with further features, objects, aspects and advantages thereof will be more clearly understood from the following description considered in conjunction with the accompanying drawings in which like reference numerals are used to refer to corresponding elements throughout the various views.

FIG. 1 is a partial side elevational view of the upper portion of a food processor, illustrating the improved feedtube protector incorporating the present invention in operating position on the expanded feedtube.

FIG. 2 is a front view of the feedtube protector shown in FIG. 1 with parts broken away to more clearly illustrate the novel features of the present invention.

FIG. 3 is a bottom view, partly broken away in section of the feedtube protector shown in FIG. 2.

FIG. 4 is a partial cross-sectional view taken along line 4—4 of FIG. 2.

FIG. 5 is a perspective view with the upper portion cut off of the food pusher shown without the feedtube protector for clearly showing the L-shaped clean-out and drain ports in accordance with the present invention.

DESCRIPTION OF THE PREFERRED EMBODIMENTS

Referring now to FIG. 1, a food processor, referred to generally with the reference numeral 10, includes a work bowl 12 closed by a cover 14 which is arranged in locked relationship in its normal operating position on the bowl 12 whenever the food processor 10 is in operation. A tool-engaging drive member 18 which is driven by an electric motor drive (not shown) has a rotary food processing tool 20 mounted on it for rotation therewith. The tool-engaging drive member 18 may accommodate a variety of different types of food processing tools 20 which may be selectively mounted on the drive member for rotation therewith. The work bowl 12 with the cover 14 attached thereto surrounds and covers the rotary tool 20. The cover 14 includes a feedtube 16 extending upwardly therefrom defining a first food passageway which extends downwardly through the cover providing an opening which overlies the rotary tool 20 in the work bowl 12 thus constituting a means for applying food items through the cover onto the rotating tool 20 for processing thereby.

The cover 14 also includes an actuator housing 22 which when the cover is locked in normal operating position on the bowl 12 overlies an operating rod (not shown) in a manner more fully described and claimed in Williams application Ser. No. 542,766, which is a continuation-in-part of Ser. No. 500,327 entitled "SINGLE MOTION FEEDTUBE PROTECTOR AND ACTUATOR FOR A FOOD PROCESSOR," now abandoned. The manner in which the bowl is mounted on a base housing containing an electric motor drive and the manner in which the cover is properly mounted on the bowl to enable actuation of the motor drive of the food processor 10 are more fully shown and described in the aforesaid Williams patent and in this Williams application and do not constitute any part of the present invention, and accordingly, will not be described in detail.

The feedtube 16 has an elongated oval shape and is referred to as an expanded feedtube which is adapted to accommodate the processing of relatively large food items. In view of the shape and size of the expanded feedtube 16, it is protected by a feedtube protector, referred to generally by the reference number 25. The feedtube protector 25, as is best illustrated in FIG. 2, includes an outer sleeve 24 which has the same oval-shaped cross-sectional configuration as, but slightly larger than, the exterior of the feedtube 16 over which it is adapted to nest in close fitting but easily slidable relationship.

Near the top edge of the outer sleeve 24 are a plurality of guide means 26 in the form of inwardly projecting elements, for example, ridges, lugs or splines, rigidly secured to the outer sleeve 24 on which a large food pusher 28 is slidably mounted in captivated relationship. The large food pusher 28 has an oval-shaped cross-sectional configuration slightly smaller than, the large vertical passageway 27 defined by the interior of the feedtube 16 in which it is adapted to be aligned and plunged downwardly therethrough in order to push food items, which have been placed in the passageway 27, onto the rotating tool 20 for processing in the food processor 10. This oval-shaped captured food pusher 28 has a plurality of longitudinally extending guide ways 30 therein which are engaged in sliding relationship with respective guide means 26. These longitudinal guide ways 30 may, for example, be in the form of molded channels, grooves or spline-ways extending along the outside surface of the large captivated food pusher 28 as is illustrated in FIG. 3. The longitudinal guide ways 30 extend down from near the top of the food pusher 28 to near the bottom 32 thereof. Accordingly, the guide ways 30 which are not open on either end serve as stops to limit either the upward or downward movement of the captured food pusher 28 with respect to the outer sleeve 24.

The outer sleeve 24 of the feedtube protector 25 carries an actuator leg 34 and a latching leg 36. When the feedtube protector 25 is properly positioned and nested on the feedtube 16, when the cover 14 is secured in proper position on the bowl 12, the legs 34 and 36 extend into the actuator housing 22 to enable operation of the motor drive of the food processor 10 in a manner described in the aforesaid Williams patent application. In the particular arrangement described in the Williams application the feedtube protector 25 enables or disables the motor drive of the food processor 10 by a single vertical downward or upward motion for effecitvely and conveniently and quickly controlling the operation of the food processor.

The Williams single-vertical-motion feedtube protector operating mechanism forms no part of the present invention and is shown as illustrative of a preferred food processor in which the present invention may be employed to advantage. It is to be understood as described hereinafter, that the present invention is applicable to any type of feedtube protector having a captivated food pusher.

The Williams single-vertical-motion feedtube protector referred to above requires the feedtube protector 25 to be removed before loading the large passageway 27 in the feedtube 16. After loading, the feedtube protector is nested on the feedtube, which aligns the food pusher 28 in the food passageway 27 ready to be manually plunged downwardly therein to feed food items onto the rotary tool 20.

To process long narrow, food items, for example such as carrots, celery, cucumbers, pepperoni, etc., a smaller feedtube 38 is provided. This smaller feedtube 38 is a circular tubular member extending vertically through the large food pusher 28. This smaller feedtube 38 has its own removable food pusher (not shown) which is capable of being plunged downwardly through the smaller feedtube to push food items which have been deposited therein onto the rotary tool 20. The circular feedtube 38 is positioned centrally in the large oval-shaped food pusher 28 by a pair of diametrically opposed mounting webs 40 extending between the feedtube 38 and the large food pusher 28 (see FIG. 3).

This supporting structure for the feedtube 38, namely the webs 40 divide the large food pusher 28 into a pair of open-topped crescent-shaped cavities 42 (FIG. 5) which are closed at the bottom ends thereof by the bottom 32 of the large food pusher 28. Each of these crescent-shaped cavities has a pair of cusp regions 43 of convergent narrow configuration with almost inaccessible corners 45 located near the bottom 32 and near the web 40. There are four of these corner cusp regions 45 near the bottom 32. Accordingly, it is possible for food items or other particles such as dust and dirt to accummulate in the bottom corners 45 of the cusp region 43 of the oval-shaped food pusher. Since this large food pusher 28 is captured in the outer sleeve 24, the entire feedtube protector must be cleaned at the same time and these bottom cusp corners 45 are very difficult to clean thoroughly.

To alleviate this problem in accordance with the present invention, L-shaped clean-out and drain ports 44 are provided which are carved out of the upwardly extending side wall of the oval-shaped food pusher 28 and are positioned near the webs 40 and near the bottom 32. The L-shaped clean-out and the drain ports 44 are preferably arranged in mirror-symmetrical pairs adjacent each of the webs 40. Each port 44 is characterized by a relatively narrow horizontally extending leg portion 46 and by a wider leg portion 47 extending upwardly vertically from the first leg 46 to accommodate if desired, the insertion of an implement therein to dislodge any food items which have become lodged in the cusp 43 or its bottom corner 45 during use of the feedtube protector 25. As will be seen in FIG. 3, the crescent-shape of the cavity 42 is such that it is easy for food items to become lodged therein. Then, a normal cleaning process would likely require the insertion of an implement down into the cavity from above, making it difficult to clean or dislodge any food items in the cusp 43 and particularly in the bottom corner 45, and there is the difficulty in washing these constricted portions 43, 45 of each crescent-shaped cavity 42. The provision of the L-shaped clean-out and drain ports 44 provides washing and cleaning access to these interior constricted places 43, 45 of the cavities 42 and permits dislodged articles to be conveniently flushed out of each crescent-shaped cavity 42.

It is preferable to use four of these L-shaped clean-out and drain ports as illustrated and also it is preferable to symmetrically place them in mirror-image pairs on opposite sides of each web 40 near the bottom 32 not only to assure access to the cusp corners 45 of the crescent-shaped cavities 42 but also to permit dislodged articles to be flushed therefrom.

The clean-out and drain ports 44 in accordance with the present invention may be utilized on any similar food pusher in a feedtube protector having crescent-shaped cavities which are desired to be cleaned and flushed out in a normal cleaning process, which includes the capability of placing the whole feedtube protector 25 in a dishwasher. The clean-out and drain ports 44 accommodate the application of detergents as well as the rinsing out of the cavities 42 to insure that they become thoroughly cleaned. The clean-out and drain ports are advantageously utilized when the food pusher has a central smaller feedtube extending therethrough, because of the difficulty in cleaning out the crescent-shaped cavities in such a food pusher.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. In a food processor of the type including a housing containing an electric motor drive and control means for rendering said motor drive inoperative unless said control means is actuated, a bowl mountable on said housing for enclosing a rotatable tool within said bowl drivable by tool drive means when said motor drive is rendered operative by actuation of said control means, a removable cover adapted to be positioned on said bowl with an expanded feedtube mounted on said cover forming a first food passageway for feeding food items through said cover into said bowl toward the rotating tool, a feedtube protector having an outer sleeve nestable in a predetermined position around the exterior of said feedtube, a captured food pusher of oblong cross-sectional configuration being captured in telescoping relationship with respect to said outer sleeve for enabling said captured food pusher to move longitudinally within said outer sleeve, said captured food pusher being in alignment with the interior of said outer sleeve for causing said captured food pusher to become aligned with said first food passageway and plungable therein only when said outer sleeve is nested around said feedtube, said captured food pusher having a bottom surface enclosing one end of said captured food pusher which end comes into contact with the food items being fed into said bowl, a second food passageway formed by a circular-shaped tubular member extending through said captured food pusher defining crescent-shaped cavities having cusp regions within said captured food pusher, an improved feedtube protector structure comprising:

at least one clean-out port in a side wall of said captured food pusher communicating with said cusp region of each crescent-shaped cavity adjacent the bottom of said captured food pusher, and at least one drain port extending horizontally around the periphery of said bottom of said captured food pusher communicating with said cusp region of each of said crescent-shaped cavities, said clean-out port and said drain port being joined with said clean-out port extending vertically above said drain port thereby providing a means for cleaning the interior of said captured food pusher.

2. In a food processor, the improved feedtube protector set forth in claim 1 having a plurality of clean-out and drain ports spaced in said side wall communicating with said cusp region of each of said crescent-shaped cavities adjacent said bottom of said captured food pusher.

3. In a food processor, the improved feedtube protector set forth in claim 2 in which said plurality of clean-out and drain ports are symmetrically spaced in said side wall around said bottom of said captured food pusher.

4. In a food processor, the improved feedtube protector set forth in claim 1 in which said captured food pusher has an oval cross-section.

* * * * *